United States Patent Office 2,908,872
Patented Oct. 13, 1959

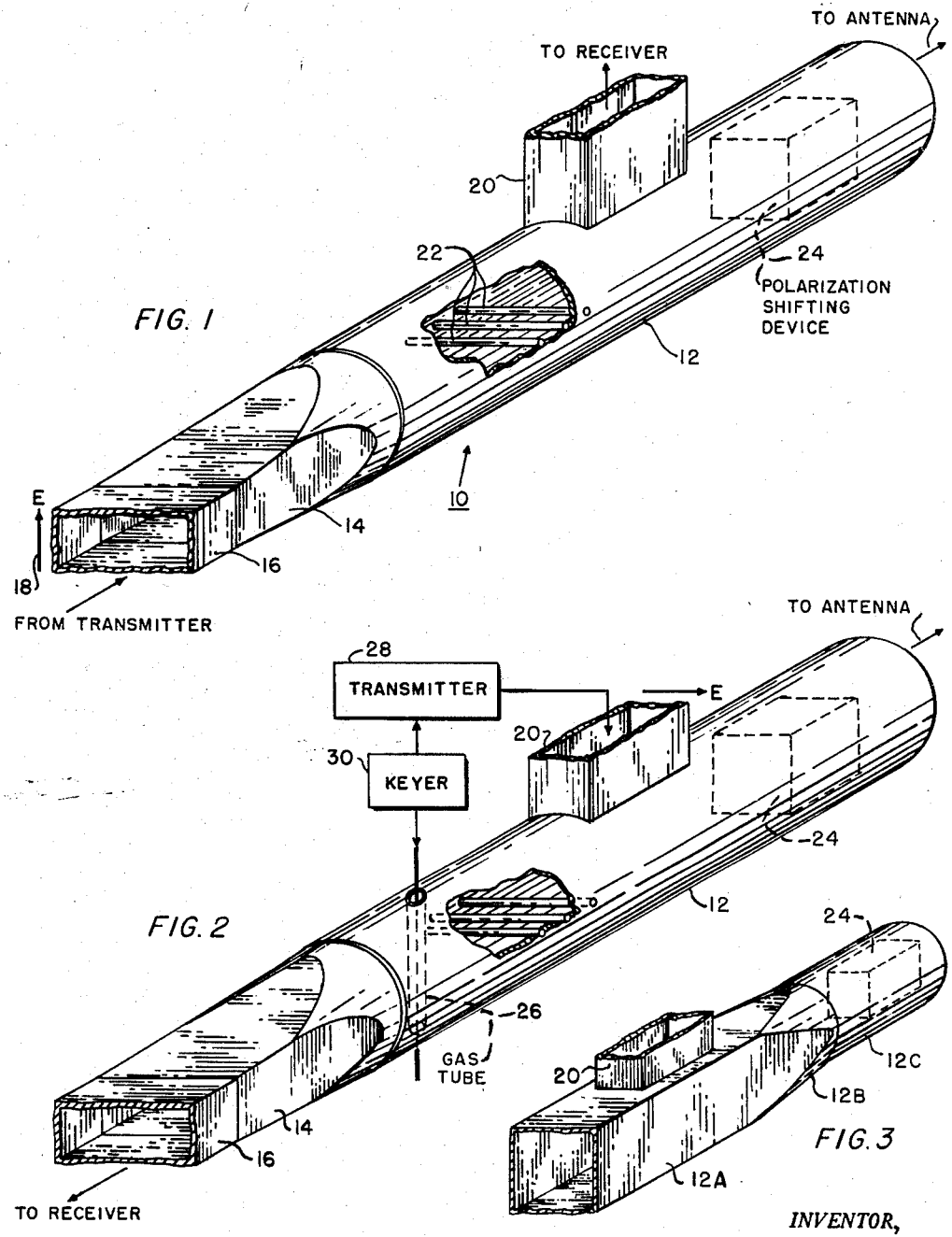

2,908,872
DUPLEX SYSTEM

Kenton Garoff, Little Silver, N.J., assignor to the United States of America as represented by the Secretary of the Army Application March 31, 1955, Serial No. 498,462

2 Claims. (Cl. 333—9)

(Granted under Title 35, U.S. Code (1952), sec. 266)

The invention described herein may be manufactured and used by or for the Government for governmental purposes, without the payment of any royalty thereon.

My invention relates to duplexing systems, and more particularly to those of the polarization shifting type.

In pulse-echo types of radar systems wherein a common antenna is used for both transmitting and receiving, a duplexing means is provided to first decouple the receiver from the transmitter to prevent damage to the receiver and reduce loss of transmitted energy, and then to couple the receiver for reception to the antenna and decouple the transmitter therefrom.

In one type of duplexer, the transmitted energy is propagated from the transmitter to the antenna along a circular wave guide in the $TE_{1'1}$ mode. The receiver wave guide is connected to an intermediate point on the circular wave guide.

The receiver wave guide is made rectangular, and is so oriented that it is strongly decoupled from the energy in the $TE_{1'1}$ mode. A polarization twisting device is inserted in the circular wave guide between the receiver and the antenna, whereby the polarization of the incoming echoes is shifted 90° with respect to energy arriving from the transmitter, so that they can enter the receiver wave guide.

Although in such a system it is possible to make the power level of the energy from the transmitter which reaches the receiver 25–40 decibles lower than the transmitter power level, in practice such results cannot be achieved. This is due to the fact that energy from the transmitter is reflected from the antenna circuits back toward the receiver, and the polarization of this energy is also shifted 90° so that it can enter the receiver wave guide. Because of such reflections, the amount of decoupling of the receiver wave guide from the transmitted energy is considerably reduced.

In accordance with my invention, the relative positions of the receiver and transmitter couplings along the circular wave guide are interchanged and one or more gas tubes properly oriented relative to the E-vector of energy reflected from the antenna are positioned within the wave guide to further improve the amount of decoupling of the receiver.

For a better understanding of the invention, together with other objects thereof, reference is had to the following description, taken in connection with the accompanying drawing, in which:

Fig. 1 is a perspective view of a prior art duplexer, with a portion broken away to show the internal structure;

Fig. 2 is a similar view of an improved duplexer constructed in accordance with my invention; and Fig. 3 is a fragmentary perspective view of a modification of Fig. 2.

To better explain the invention herein the prior art device shown in Fig. 1 will first be explained. Numeral 10 indicates the duplexer which comprises a cylindrical wave guide 12. This wave guide is connected through a tapered transition section 14 to a rectangular wave guide, a portion of which is shown at 16. Wave guide 16 is coupled to the transmitter and is energized thereby in the $TE_{1'1}$ mode, the E-vector of which is indicated by arrow 18.

Extending perpendicularly from cylindrical wave guide 12 is a second wave guide 20 adapted to be connected to, or contain a portion of, the receiver. The long dimension of wave guide 20 is perpendicular to that of wave guide 16, so that energy from the transmitter is highly attenuated and the receiver is protected therefrom.

Within wave guide 12, at a position between the two rectangular wave guides, are fastened one or more conductive rods 22, in this case brass rods, extending in a direction parallel to the long dimension of wave guide 16. Brass rods 22 are suitably spaced along the axis of cylindrical wave guide 12 and parallel to each other. Since these rods extend in a direction which is perpendicular to the plane of polarization of the E-vector of the energy in the $TE_{1'1}$ mode propagated from the transmitter through wave guide 12, they have little effect upon the transmitted energy and the latter passes with little attentuation toward the output end of cylindrical wave guide 12 which leads to the antenna.

Located within cylindrical wave guide 12, between the output end thereof and receiver wave guide 20 is a conventional polarization shifting device, symbolically indicated by numeral 24, which is adapted to shift the plane of polarization of the wave passing therethrough.

Polarization shifting device 24 may be a ferrite rod surrounded by a magnetic field extending longitudinally along the rod, and adapted to rotate the electric field of energy passing therethrough by 45°. Thus pulse energy passing from the transmitter through device 22 to the output of circular wave guide 12 has its electric field rotated by 45°. The echo pulse energy received by the antenna and passing through device 22 in the reverse direction has its E-vector rotated another 45° so that the E-vector of the energy propagated toward the transmitter and receiver is rotated 90° with respect to the energy from the transmitter. Because of this rotation this energy will be reflected by brass rods 22, and thus be kept out of the transmitter circuit. The orientation of the E-vector is now such as to provide good coupling to the receiver arm 20, whereby the reflected energy is decoupled from the transmitter arm 16 and strongly coupled to receiver arm 20.

Another well known type of polarization shifter that can be used comprises a plurality of spaced ionizable gas tubes extending transversely to the direction of propagation. The gas in these tubes is ionized by the high power transmitter signal, and each tube rotates the polarization a small amount. By using a sufficient number of tubes, the polarization of the transmitter signal is shifted 90°. Since the echo pulse signal is too weak to ionize the gas, no shifting of the plane of polarization of the echo signal occurs, so that the echo signal is, as in the case of the ferrite device above described, decoupled from the transmitter arm and strongly coupled to the receiver arm.

The degree of decoupling is determined by the symmetry of the receiver arm with respect to the transmitted E field. If the field of the energy in the transmitter arm is not perfectly linearly polarized, the amplitude of components of the E field which are orthogonal to the main or desired component thereof may be considerable and will enter the receiver arm. Even under such conditions it has been possible to obtain an amount of decoupling such that power in the receiver arm can be 25–40 decibels below that in the transmitter arm if other difficulties are not present.

These difficulties are due to the fact that the chief factor that will reduce the decoupling of the receiver while the transmitter is operating results from the reflection from the antenna or other discontinuities. The polarization of the energy reflected from such discontinuities will also be shifted 90° so that the E field will then couple to the receiver arm. With what is considered highly acceptable voltage standing wave ratios such as 1.1 to 1 this factor limits the decoupling to 27 decibels even assuming perfect symmetry of the transmitted E field with respect to the axis of the receiver arm. At voltage standing wave ratios of 1.5 to 1, which is considered a limit in many pulsed microwave radars, the decoupling would be only 14 decibels because of reflections feeding into the receiver arm.

Reference is now made to Figure 2, which illustrates the features of my invention which substantially reduce the difficulties above mentioned. Like reference numerals in Figs. 1 and 2 indicate identical structures. It will be seen that the wave guide structure of Fig. 2 is identical to that of Fig. 1. However, in Fig. 2 the positions of the transmitter and receiver arms are reversed, so that the energy from the transmitter 28 is now fed to arm 20 and the receiver is coupled to arm 16. As a result, the rods 22 are now parallel to the E-vector of the energy from the transmitter arm and reflect this energy so that it is kept out of the receiver arm. On the other hand, since device 22 causes the E-vector of the echo pulses to be shifted 90°, the rods 22 are perpendicular to this E-vector and hence have no effect on the energy traveling toward the receiver arm.

In accordance with this invention, the deleterious effects of reflected energy, as above described, are substantially reduced by the insertion of one or more spaced parallel gaseous discharge tubes 26 within the circular wave guide 12. If more than one such tube is provided they are suitably spaced from each other along the axis of wave guide 12. The amount of spacing of such tubes 26, as well as the spacing of rods 22 is dependent upon the frequency of the energy involved. The orientation of tube 26 is perpendicular to that of rods 22. The gas in tube 26 is normally in an un-ionized state, but is ionized by pulses from keyer 30 which also pulses transmitter 28. Thus tube 26 is ionized in synchronism with the transmission of each pulse.

Since the orientation of tube 26 is such that it is parallel to the E-vector of the transmitted energy which is reflected by the antenna circuit because of discontinuities therein, and comes back through the polarization shifting device 24, tube 26 will, because it is ionized during pulse transmission, reflect such energy and keep it out of the receiver. However, when transmission ceases, tube 26 becomes de-ionized, and any echo pulses that come in will not be affected thereby so that said echo pulses can reach the receiver. Tube 26 will also serve to reflect any undesirable components occurring during operation of the transmitter arising from the fact that the energy injected into the circular wave guide may not be perfectly linearly polarized.

When circular wave guides are used there is a tendency for the polarization of the wave therein to rotate because of irregularities or discontinuities therein, even of a minute extent. This will result in imperfect operation of the reflector rods 22 and gas tube 26. To overcome this, all of wave guide 12, except the section which contains the polarization shifting device 24, is made in the form of a square wave guide as shown at 12A in Fig. 3. Section 12A is coupled, through a transition section 12B, to a circular section 12C which contains the polarization shifting device 24. Section 12C is made circular since device 24 generally shifts the polarization gradually in a plurality of stages to produce the required amount of shift, hence section 12C should be circular so that it will uniformly transmit waves having any plane of polarization.

While there has been described what is at present considered a preferred embodiment of the invention, it will be obvious to those skilled in the art that various changes can be made therein without departing from the invention, and it is, therefore, aimed in the appended claims to cover all such changes and modifications as fall within the true spirit and scope of the invention.

I claim:

1. In a radio pulse-echo system having pulse transmitter, receiver and antenna components, duplexing means adapted to control the flow of energy between said components, said duplexing means comprising a main wave guide at least a portion of which is cylindrical and a second portion of which is shaped to render it capable of substantially equally propagating energy polarized in two mutually perpendicular planes, said first and second portions being connected end to end in wave transmission relation with each other, said first portion being coupled at its free end to said antenna component and operating to transmit energy to and from that component, said second portion including at its free end a first polarized means which is more sensitive to energy polarized in one of said planes and is coupled to said receiver component to transmit such energy thereto, a second polarized means coupled at one end to said transmitter component and adapted to propagate only energy received therefrom which is polarized substantially in the other of said planes, said second polarized means being coupled at its other end to said main waveguide at an intermediate point therein, a polarization shifting device located within said cylindrical portion of said main waveguide and adapted to shift the polarization of wave energy passing through the device in the direction toward said transmitter and receiver components substantially 90° relative to wave energy arriving thereat from said transmitter component in the opposite direction, a rod-shaped gas discharge tube having an ionizable gas therein, within said main waveguide between said first and second polarized means, said tube being oriented in a direction to reflect, when said gas is ionized, only waves having a polarization to which said first polarized means is sensitive to keep these waves out of said receiver component, and means coupled to said tube and said transmitter component for ionizing said gas in synchronism with the transmission of said pulse.

2. A pulse-echo signal communication system comprising a pulse transmitter, a receiver, a common transmitting and receiving antenna and duplexing means comprising a main wave guide line including a cylindrical wave guide portion at one end coupled to said antenna and a first rectangular waveguide at the other end coupled to said receiver, a second rectangular wave guide coupling said transmitter to said wave guide line at an intermediate point, said second rectangular wave guide being oriented so as to be adapted for propagating to said main wave guide line for transmission to said antenna wave energy received from said transmitter polarized in one of two mutually perpendicular planes, said first rectangular wave guide being relatively oriented so as to be adapted for propagating wave energy received over said main wave guide line to said receiver polarized in the other of said two planes, a polarization shifting device inserted within the cylindrical wave guide portion of said main line at a point between said antenna and said second rectangular wave guide and adapted to shift the polarization of wave energy received from said antenna and propagated through that device in the direction toward said transmitter and receiver 90° with respect to that of the wave energy received in the opposite direction from said transmitter, at least one rod-shaped discharge tube having an ionizable gas therein, inserted within said main wave guide line at a point between said second and said first rectangular wave guide, said tube being oriented in a direction such that when the gas therein is ionized, it reflects only the transmitter wave energy reflected from said antenna due to discontinuities therein and returning through said polarization shifting device, so as to block that energy from said receiver, means coupled to said tube and said transmitter for causing the gas in the tube to be ionized in synchronism with the transmission of each signal pulse from said transmitter, and at least one conductive rod situated within said main wave guide line between said second and said first rectangular wave guide and oriented in a direction perpendicular to said tube to reflect waves transmitted by said second rectangular wave guide so as to keep these waves out of said receiver.

References Cited in the file of this patent

UNITED STATES PATENTS

| | | |
|---|---|---|
| 2,454,761 | Barrow et al. | Nov. 30, 1948 |
| 2,558,664 | Pease | June 26, 1951 |
| 2,594,732 | Cork | Apr. 29, 1952 |
| 2,606,248 | Dicke | Aug. 5, 1952 |
| 2,607,849 | Purcell | Aug. 19, 1952 |
| 2,644,930 | Luhrs | July 7, 1953 |
| 2,725,531 | Fiske | Nov. 29, 1955 |
| 2,748,353 | Hogan | May 29, 1956 |
| 2,850,624 | Kales | Sept. 2, 1958 |

FOREIGN PATENTS

| | | |
|---|---|---|
| 664,926 | Great Britain | Jan. 16, 1952 |